SIGNAL VOLTAGE FREQUENCY CONVERTER
Filed June 16, 1945
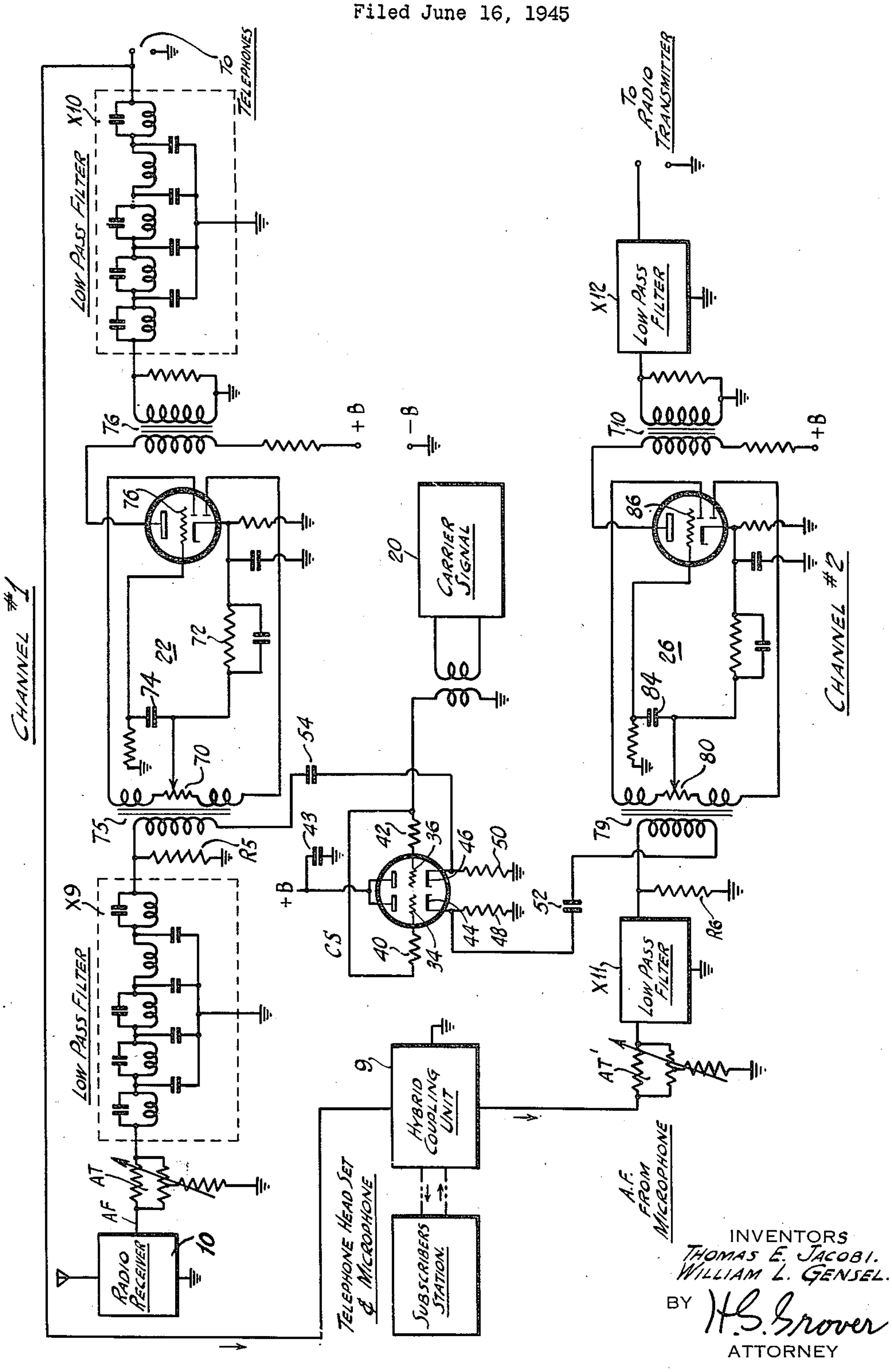
INVENTORS
THOMAS E. JACOBI.
WILLIAM L. GENSEL.
BY H. S. Grover
ATTORNEY Patented Oct. 28, 1952 2,616,075

UNITED STATES PATENT OFFICE 2,616,075

SIGNAL VOLTAGE FREQUENCY CONVERTER

Thomas E. Jacobi, Westmont, N. J., and William L. Gensel, Philadelphia, Pa., assignors to Radio Corporation of America, a corporation of Delaware Application June 16, 1945, Serial No. 599,830

3 Claims. (Cl. 332—48)

This application relates to signalling means, and in particular to improved means for supplying oscillations to signalling circuits, in each of which the oscillations may be used as desired with other currents or oscillations.

In some applications such as, for example, two-way communication wherein oscillations are used in the sending channels and oscillations of like frequency are used in the receiving channels, it is necessary that the oscillations be of the same frequency. To simplify such arrangements we make use of a single oscillator coupled to both channels so that oscillations supplied to the channels are of the same frequency.

When oscillations from a common source are supplied to circuits one or both of which carry other currents, there is danger that the said two circuits will be coupled by the oscillation supply connections, so that the currents in one or both of the circuits will interfere with the currents in the other circuit. An example of such an arrangement is found in communication systems wherein two-way communication from each station is accomplished by using at each station a common oscillator which provides oscillations to invert the signals to be sent out and also supplies oscillations to reinvert and recover the message from the incoming signals.

An object of our invention is an improved one way coupling between a generator and two or more channels wherein oscillations from the generator are used.

A more specific object of our invention is improved couplings between a common generator and the transmitting inverting converter or modulator and amplifier; and between the common generator and the receiving reinverting converter or modulator and amplifier in an inverted speech or other signal communication system.

By inverting the signals secrecy is attained. To invert the signals the oscillator frequency may be located in the upper margin of the signal frequency spectrum and the difference frequency selected so that the signals originally of high frequency are of low frequency and vice versa. The inverted signals are reinverted to recover the signals.

The specific example given above is to facilitate description of our invention and understanding thereof. It will be obvious to those versed in the communication arts that the oscillations may be put to uses other than the use described herein, and in fact the invention is useful for many purposes wherein it is desired to supply oscillations from a single source to two or more circuits without coupling the same through the source of oscillations. That is to say, the improved couplings of our invention supply oscillations from the source to the several circuits but isolate the circuits each from the others with respect to currents in the circuits. In the description the oscillations are referred to as carrier oscillations since that is one of their purposes even though they are in the speech frequency range. Obviously, they may be of superaudible or subaudible frequency and may still serve in one channel as the carrier which is modulated by the signals and in the other channel as the beating oscillations to recover the signals from the incoming carrier.

One of the channels may have as input a radio receiver output and as an output the signal, while the other channel may have as input the output of a microphone and as output amplified signals for sending. In many cases the output terminals of one channel and the input terminals of the other channel are connected to the subscriber's station telephone headset and microphone through a hybrid coupling unit and a two wire line. Obviously, it is necessary to provide means for attenuating the carrier or oscillator frequency fed back into the input side of the channels or the oscillations couple through the hybrid unit and reach the subscriber at the headset.

An object of our invention is to provide improved coupling means as described above including means arranged for attenuating the carrier frequency fed back to the input of the channels or lines to prevent the oscillations from feeding back over the lines to the subscriber.

In the example given, the oscillations serve as carrier or inverting oscillations in a speech inverter system and the oscillations are fed into a line to be mixed therein with the audio potentials or signals. An object of our invention is to provide an improved mixing or combining arrangement.

In describing our invention in detail reference will be made to the attached drawing, wherein the single figure illustrates a common oscillator feeding oscillations to two channels of a speech signalling system arranged in accordance with our invention, and including the features enumerated above and others.

In the drawings oscillatory energy such as voice signals derived for example from a radio receiver 10 are to be translated over channel #1 through an attenuating network AT and the low pass filter X9 to a converter 22, and thence through a low pass filter X10 to an output device, which may be a telephone unit. Audio frequency currents from a source such as a microphone, for example, are to be translated over channel #2 through attenuation network AT', low pass filter X11, converter 26, and low pass filter X12 to, for example, a radio transmitter or other transmitter.

The audio signals passed by filters X9 and X11 are to be mixed with oscillations from the source 20 in the converters 22 and 26 and this is to be done without material coupling between the channels and without material feedback through the low pass filters X9 and X11 to the inputs of the two channels. The source of oscillations 20 which is designated the source of carrier signal may be of audio frequency or above or below audibility. Oscillations from 20 are fed to the grids 34 and 36 of a double triode electron tube structure. The excitation circuits include series resistors 40 and 42 which serve as grid excitation reducing impedances. The grid direct current circuits are completed through one winding of the transformer associated with source 20. The anodes of the tube systems are connected together and to the positive terminal of a source of direct current potential having its negative terminal grounded. The anodes are also substantially grounded, with respect to the alternating currents in the outputs of the cathode followers, by a capacitor 43 of appropriate size. The cathodes 44 and 46 of the electron tube systems are connected to ground by cathode return resistances 48 and 50. These resistances also serve as the output impedances of the two triode systems. The electron tube systems may be in a single envelope as shown, or may be in separate envelopes.

The cathode impedance or load of one tube system, say for example, the impedance 48, is coupled by a coupling and direct current blocking capacitor 52 to the primary winding of a transformer T9 in series with the low pass filter X11. The other output or load impedance 50 is similarly coupled by a coupling and blocking capacitor 54 to the primary of transformer T5 in series with the low pass filter X9. The low pass filters X9 and X11 may be of any type and the inputs thereof are connected by attenuating networks AT and AT' to the outputs of the radio receiver and microphone.

The secondary winding of transformer T5 is coupled to an inverter stage 22, while the secondary winding of transformer T9 is coupled to an inverter stage 26. These inverting converter stages are of the full wave type, each including a tube system having two diodes and a triode in a common envelope. The secondary winding of the transformer T5 is in two parts separated by a potentiometer resistance 70, the electrical center of which is connected by a rectifier load impedance 72 to the tube cathode. The free terminals of the secondary winding of transformer T5 are coupled to the diodes of the tube for full wave rectification. When rectification takes place the potential drop through load resistor 72 is applied by capacitor 74 to the control grid 76 so that variations in the potential drop which take place in resistance 72 are amplified by the triode section of the tube and fed by the transformer T6 to the low pass filter X10. A similar rectifier action takes place in the converter 26 and channel #2. Since in this converter the operation is the same as in the converter and rectifier 22 the same will not be described. Reference numerals corresponding to those used in the converter 22 plus 10 have been used in the converter 26.

The oscillations developed in 20 are coupled through the load impedances 48 and 50 into the transformers T9 and T5. These oscillations beat with the signals from low pass filters X11 and X9 in the mixing and converting stages 26 and 22 and the converted currents are supplied as output through low pass filters X12 and X10, which select the difference frequency components.

The currents representing signals supplied to X9 and X11 may be limited to a range of say 300 to 2700 cycles per second. The low pass filters X9 and X11 are then adjusted to cutoff at about 2700 cycles. Filters X10 and X12 are similarly adjusted. The source 20 may then be of the order of 3000 cycles per second, in which case the difference output of converters 22 and 26 is selected by filters X10 and X12 and in both channels the signals are inverted. That is, in each channel a signal fed to the converter therein at a frequency of say 2700 cycles per second is represented in the converter output by a component having a frequency of 300 cycles, while a signal fed to the converter in said channel at a frequency of say 300 cycles per second is represented in the converter output by a component having a frequency of 2700 cycles per second. Now if the two channels are used in a two-way communication system the inverted signals from channel #2 may be supplied to a transmitter, while the inverted signals in channel #1 may represent the output of a receiver of the transmitted inverted signals from a distant station having similar equipment, in which case the converter at 22 reinverts the signals to supply readable signals through transformer T6 and filter X10 to the telephones.

In systems of the type illustrated as known heretofore, a bridge circuit arrangement has been used to couple the carrier source 20 to the #1 and #2 channels. Then the bridge has four impedance arms with one diagonal in parallel to the primary winding of a transformer in the position of T5 and the other diagonal in parallel to the primary winding of a transformer in the position of T9. The generator 20 in these bridge arrangements would feed a transformer primary winding the secondary of which is in series with the impedance of one bridge arm. These bridge circuits permitted too much coupling between the channels and this resulted in cross-talk. To reduce the coupling and cross-talk attenuation was introduced, thereby lowering the efficiency of the system.

The cathode follower stages arranged, in accordance with our invention, between the source 20 and channels #1 and #2 reduce the coupling between the channels and thereby reduce the cross-talk and the need of attenuation. In the bridge circuit arrangements, substantially the full carrier voltage was supplied to the filters X9 and X11, which had to provide a high attenuation to voltages of the carrier frequency in order to prevent them from being fed back through filter X11 to the hybrid coil 9, and thence to the subscriber station. The low pass filters X9 and X11 stop feedback at the carrier frequency to some extent, but not completely. Feedback through filter X9 takes place in like manner, but since it is not connected to the hybrid coil 9, this feedback is not of importance.

In the improved arrangement of the present invention an increased attenuation of carrier feedback has been obtained by connecting the source of carrier voltage, say impedance 48, the isolating and coupling capacitor 52, the primary winding of transformer T9 and the filter X11 (which is shunted by a terminating resistor R6) all in series. The primary winding of transformer T9 has a much higher impedance to the carrier voltage than either source 48 or filter X11 and resistance R6 in parallel. Thus only a fraction of the carrier voltage appears across the filter X11 terminals, whereas formerly the full carrier voltage was applied to these terminals. Thus for the same filter the voltage fed back through hybrid coil 9 to the subscriber station is reduced by this same fraction (in addition to the attenuation of the filter X11 at the carrier frequency). Alternatively, for a permissible amount of voltage fed back, a simpler and more economical filter may be used at X11. It is desirable if not essential to choose a type of filter at X11 having a characteristic impedance at the carrier frequency which is less than the value of characteristic impedance in the pass band of the filter, because this aids in keeping the voltage drop at carrier frequency across the filter X11 to a low value. However, even if a type of filter having a higher than normal impedance at the carrier frequency is used, R6, which will have a value approximately equal to the normal characteristic impedance, will limit the parallel impedance of it and filter X11 to a value less than that of the primary winding of transformer T9.

Carrier feedback through filter X9 is reduced in like manner by the arrangement of capacitor 54, transformer T5, filter X9, etc., because channel #1 and its coupling to source 20 are similar to channel #2 and its coupling to source 20.

In mixer systems of this type known heretofore the carrier voltage was applied to the transformer T5 and the filter X9 in parallel. Since the filter X9 is of relatively low impedance, a moderate amount of power had to be supplied by the oscillator 20. This reduced the oscillator stability and increased its distortion. The improved circuit provides for supplying the carrier voltage through the primary winding of T5 and the filter X9 in series. Since the primary winding of T5 is of much higher impedance than the filter X9, the amount of power which must be supplied in the improved system is very much less than formerly. Furthermore, the oscillator 20 now need only supply voltage to the very high impedance of the grid circuit of the coupling stage CS. Therefore, the carrier power required from the oscillator 20 is minute compared with what was required heretofore. In this way we provide an improved method of mixing the low frequency carrier with the audio signal in the same transformer winding, but at a higher impedance to the carrier. The method of mixing in channel #2 is similar and need not be described in detail.

By using like values of circuit components in the couplings to each channel like amounts of carrier voltage are supplied to each of the inverter stages 22 and 26. The inverter stages preferably are balanced and are substantially similar in operation. The gain through the channels, i. e., the audio frequency inputs thereto, is adjusted by adjusting the potentiometer and/or networks AT and AT'. To insure proper elimination of the fundamental from the outputs of the inverters 22 and 26 the potentiometers 70 and 80 are adjusted to get balanced diode rectification in the inverter triode diode systems. When these adjustments are carried out properly equal outputs may be obtained at the outputs of filters X10 and X12.

As stated above, the two channels may be put to any use and the filter X10 may supply telephones or similar utilizing equipment while the filter X12 may supply a transmitter or similar utilizing equipment. In the particular application the output of filter X10 is supplied, as stated hereinbefore, by way of a hybrid coupling unit 9 to the lines running to a subscriber's station, at which a telephone set is operated by the output of filter X10. A microphone may also be located at the subscriber station, to supply currents representing voice signals through the unit 9 to the input of channel #2. The input of channel #1 may be the output of a detector in a radio receiver.

What is claimed is:

1. In a modulator, an electron discharge rectifier system having input electrodes and having output electrodes coupled to an output circuit, a transformer having a secondary winding coupled to the input electrodes of said rectifier system, a cathode follower stage having an input and having a cathode impedance, means coupling said cathode impedance in series with the primary winding of said transformer, means for impressing modulating potentials across said series coupling, means for impressing oscillations of carrier wave frequency on the input of said cathode follower stage.

2. In a secret signalling system, means for inverting the frequency of alternating currents representing signals comprising, a source of alternating currents representing signals, a transformer having a primary winding and a secondary winding, a source of oscillatory energy of a frequency higher than the highest alternating current frequency, means connecting said source of alternating currents representing signals, said primary winding, and said source of oscillatory energy in series in the order given, a rectifier system coupled with the secondary winding of said transformer, and means coupled to said rectifier system for selecting currents in a band of frequencies covered by the difference between the frequency of said source of oscillatory energy and the frequencies of the currents representing signals.

3. In apparatus for converting alternating currents of one frequency to alternating currents of another frequency, a transformer having a primary winding and a secondary winding, a source of alternating current of said one frequency, a source of heterodyning oscillatory energy, means connecting said sources of alternating current, said primary winding and said source of oscillatory energy in series in the order given, and a rectifier system coupled with the secondary winding of said transformer.

THOMAS E. JACOBI.
WILLIAM L. GENSEL.

REFERENCES CITED

The following references are of record in the file of this patent:

UNITED STATES PATENTS

| Number | Name | Date |
|---|---|---|
| 1,522,044 | Bown | Jan. 6, 1925 |
| 1,571,010 | Kendall | Jan. 26, 1926 |
| 2,051,493 | Lunnon et al. | Aug. 18, 1936 |
| 2,109,561 | Wright | Mar. 1, 1938 |
| 2,224,690 | Moody et al. | Dec. 10, 1940 |
| 2,233,927 | Thomas | Mar. 4, 1941 |
| 2,238,236 | Terman | Apr. 15, 1941 |
| 2,240,420 | Schnitzer | Apr. 29, 1941 |
| 2,240,580 | Severin | May 6, 1941 |
| 2,281,020 | Bruck | Apr. 28, 1942 |
| 2,300,999 | Williams | Nov. 3, 1942 |
| 2,315,567 | Webb | Apr. 6, 1943 |